(12) United States Patent
Chiu et al.

(10) Patent No.: US 7,900,179 B2
(45) Date of Patent: Mar. 1, 2011

(54) METHOD FOR PRIORITIZING NODES FOR REROUTING AND DEVICE THEREFOR

(75) Inventors: Kok-Hoong Kenny Chiu, Austin, TX (US); Kenneth Faulkner, Austin, TX (US)

(73) Assignee: Globalfoundries Inc.

( * ) Notice: Subject to any disclaimer, the term of this patent is extended or adjusted under 35 U.S.C. 154(b) by 289 days.

(21) Appl. No.: 12/127,392

(22) Filed: May 27, 2008

(65) Prior Publication Data

US 2009/0300565 A1 Dec. 3, 2009

(51) Int. Cl.
G06F 17/50 (2006.01)
(52) U.S. Cl. .................................. 716/126; 716/100
(58) Field of Classification Search ............... 716/1, 716/12, 100, 126
See application file for complete search history.

(56) References Cited

U.S. PATENT DOCUMENTS

| | | | |
|---|---|---|---|
| 7,111,268 B1 * | 9/2006 | Anderson et al. | 716/11 |
| 7,134,112 B1 * | 11/2006 | Anderson et al. | 716/13 |
| 7,581,201 B2 * | 8/2009 | Kazda et al. | 716/6 |
| 2003/0174723 A1 * | 9/2003 | DeHon et al. | 370/404 |
| 2005/0034091 A1 * | 2/2005 | Harn | 716/6 |
| 2008/0028345 A1 * | 1/2008 | Suri et al. | 716/2 |
| 2008/0092099 A1 * | 4/2008 | Lin et al. | 716/8 |
| 2008/0209376 A1 * | 8/2008 | Kazda et al. | 716/6 |

* cited by examiner

Primary Examiner—Jack Chiang
Assistant Examiner—Suchin Parihar

(57) ABSTRACT

A system and methods are disclosed to prioritize circuit nodes that interconnect the device components of an electronic device design for rerouting. The prioritized nodes can be used to focus effort on improving the quality of signal nodes in an efficient manner. Re-routable nodes are first identified by comparing the signal propagation time delay of each node in the design to an ideal propagation time delay of an ideal route of that node, and selecting the nodes that have a deviation from the ideal delay that exceeds a specified threshold. Once the set of re-routable nodes is identified, each node is then prioritized based on the propagation time delay of a complete path encompassing that node. These nodes can then be re-routed based upon their associated priority.

20 Claims, 4 Drawing Sheets

US 7,900,179 B2

METHOD FOR PRIORITIZING NODES FOR REROUTING AND DEVICE THEREFOR

FIELD OF THE DISCLOSURE

The present disclosure relates generally to electronic devices and more specifically to tools for designing electronic devices.

BACKGROUND

Modern electronic integrated circuit devices can include hundreds of millions of device components and signal nodes that interconnect the device components. As the complexity of integrated circuits continues to increase, advanced design methodology and advanced automation are employed to increase the productivity of the circuit designers who implement these devices. One type of automation commonly utilized today is a tool known as a signal auto-router. Routing involves defining the signal nodes that conduct signals between the device components that make up the design. Auto-routers automatically synthesize these signal nodes.

Automated routing algorithms, especially when combined with automated device component placement algorithms, are complex. The density of the device components, the large number of signal nodes, and other layout blockages or obstructions can lead to significant congestion of the signal node routing conductors which can result in excessively long or circuitous routing paths for signal nodes, and thus lower design performance. Further, optimizing the routing of a large number of conductors is a difficult and time-consuming task. Accordingly, an improved technique for optimizing signal routing would be advantageous.

BRIEF DESCRIPTION OF THE DRAWINGS

Embodiments incorporating teachings of the present disclosure are illustrated and described with respect to the drawings presented herein.

DETAILED DESCRIPTION

A system and methods are disclosed to prioritize circuit nodes that interconnect the device components of an electronic device design for rerouting. The prioritized nodes can be used to focus effort on improving the quality of signal nodes in an efficient manner. Re-routable nodes are first identified by comparing the signal propagation time delay of each node in the design to an ideal propagation time delay of an ideal route of that node, and selecting the nodes that have a deviation from the ideal delay that exceeds a specified threshold. Once the set of re-routable nodes is identified, each node is then prioritized based on the propagation time delay of a complete path encompassing that node. These nodes can then be re-routed based upon their associated priority.

Figure 1:
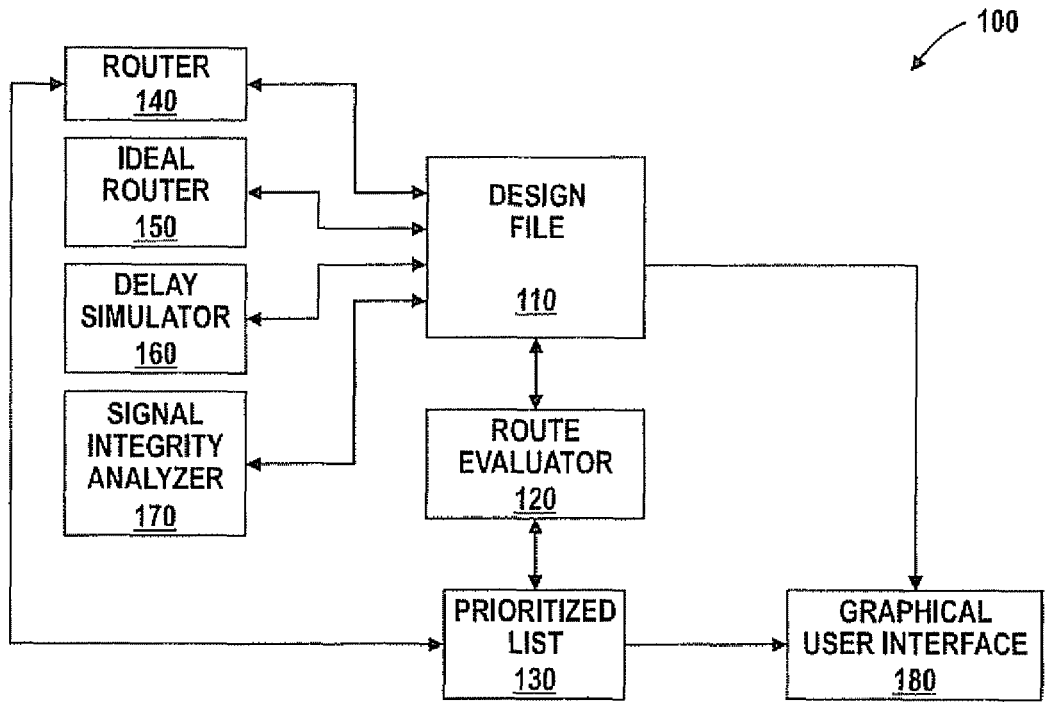
FIG. 1 includes a block diagram illustrating a system associated with computer-aided design applications in accordance with at least one embodiment of the present disclosure.

FIG. 1 illustrates a design system 100 including a design file 110 and design tools including a route evaluator 120, a router 140, an ideal router 150, a delay simulator 160, a prioritized list 130 of nodes, and a graphical user interface (GUI) 180.

Design file 110 is a data structure utilized to represent the electronic device design and its attributes. Design file 110 includes any number of such attributes including but not limited to general connectivity of device elements, spatial configuration of the polygons that represent the multiplicity of integrated circuit fabrication layers for the device, and electrical and timing information for the device. The design of the electronic device can be altered by manipulating and defining the attributes of design file 110. In addition, design file 110 can be used to form the physical electronic device. For example, the attributes stored at design file 110 can be used to provide the photolithographic masks used to fabricate the device. Design file 110 includes information identifying signal paths for the electronic device design. Such signal paths can be better understood with reference to FIG. 2.

Figure 2:
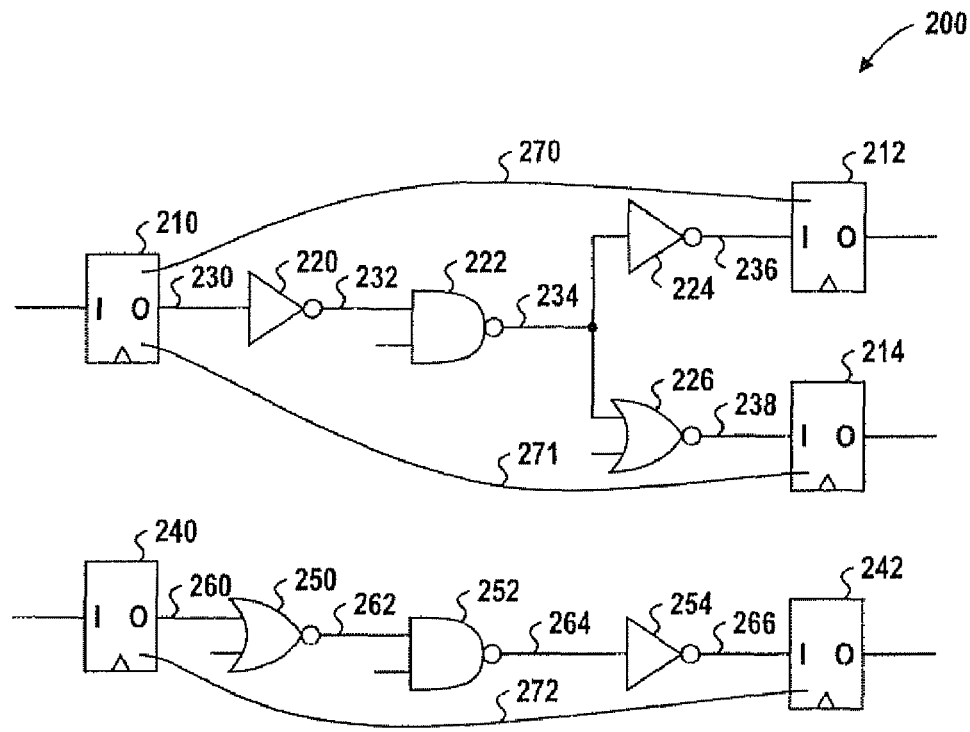
FIG. 2 illustrates a schematic view of a portion of a device design represented by a design file of FIG. 1 in accordance with at least one embodiment of the present disclosure.

FIG. 2 illustrates in schematic diagram form a portion 200 of an electronic device represented in design file 110, and specifically the connectivity view of the device. A latch 210 has a data input (connection not shown), a clock input (connection not shown), and an output connected to a signal node 230. For purposes of discussion, signal nodes are referred to herein as nodes. An inverter 220 has an input connected to node 230 and an output connected to a node 232. A NAND gate 222 has a first input connected to node 232, a second input (connection not shown), and an output connected to a node 234. Inverter 224 has an input connected to node 234 and an output connected to a node 236. A latch 212 has a data input connected to node 236, a clock input (connection not shown), and an output (connection not shown). A NOR gate 226 has a first input also connected to node 234, a second input (connection not shown), and an output connected to a node 238. A latch 214 has a data input connected to node 238, a clock input (connection not shown), and an output (connection now shown). Latch 240 has a data input (connection not shown), a clock input (connection not shown), and an output connected to a node 260. A NOR gate 250 has a first input connected to node 260, a second input (connection not shown), and an output connected to a node 262. A NAND gate 252 has a first input connected to node 262, a second input (connection not shown), and an output connected to a node 264. An inverter 254 has an input connected to node 264 and an output connected to a node 266. Latch 242 has a data input connected to node 266, a clock input (connection not shown), and an output (connection not shown). Latches 210, 212, 214, 240, and 242 are illustrated as latches, but can represent any sequential device such as a flip flop.

FIG. 2 illustrates three complete logic paths labeled as paths 270, 271, and 272. The path 270 begins at latch 210, proceeds through inverter 220, NAND gate 222, inverter 224, and ends at latch 212. The path 271 begins at latch 210, proceeds through inverter 220, NAND gate 222, NOR gate 226, and ends at latch 214. The path 272 begins at latch 240, proceeds through NOR gate 250, NAND gate 252, inverter 254, and ends at latch 242. Latches delimit a path. The maximum operating frequency of the electronic device is limited by the path with the longest propagation delay between the beginning and ending latches comprising the path. The signal propagation delay associated with a path is measured from the point in time that the beginning latch receives an active clock signal transition, to when the ending latch has successfully latched the data present on its input in response to the next active clock signal transition. For example, the signal propagation delay associated with path 270 is measured from the point in time that latch 210 receives an active clock signal transition to when data resulting from the output of latch 210 is available at node 236 to be latched at latch 212.

The signal propagation delay of a path includes delay introduced by the propagation of a signal through a device component as well as the delay introduced by the propagation of a signal between the device components via the conducting materials comprising the nodes that interconnect the device components. For example, the output of inverter 220 is connected to the input of NAND gate 222 by node 232. Node 232 is a conductor implemented as any number of individual conductive layers, using one or more conductive layers, and vias that electrically connect a conductive segment of one conductive layer to a conductive segment of another conductive layer. For purposes of discussion, conductive layers are referred to herein as metal layers, but it will be appreciated that the conductive layers and segments can be formed of conductive materials other than metal. The route of a node refers to the physical placement of the individual polygons that make up the individual metal segments and vias of a signal node. The physical length route of node 232 can vary, depending on the placement location of inverter 220 and NAND gate 222, and also depending on how efficiently the metal conductors are arranged. A node can be routed substantially directly between device components, or it can be inefficient and circuitous. The term "route" can be used to describe these node conductors, whether they are symbolic representations in design file 110 or the eventual physical metallization of the completed electronic device. The length of the metal segments, the metal-layer of each segment, and the corresponding vias comprise a node's route, and contribute resistance and capacitance to the node. The capacitance and resistance of a node contributes to the signal propagation delay exhibited by signals conducted via the node route. The signal propagation delay of a node route therefore includes not just the distance between the corresponding interconnected device components, but also on how efficiently the interconnection is routed between the device components.

Nodes 230, 232, and 234 are encompassed by two paths, including path 270 and 271. Thus, the signal propagation delay of these nodes contributes to the signal propagation delay of both paths. Some nodes are encompassed by only one path. For example, node 236 is encompassed by only path 270 and node 264 is encompassed by only path 272. The output of NAND gate 222, which drives node 234, is connected to two input terminals (an input of inverter 224 and an input of NOR gate 226), and therefore has a fanout of two. Fanout, when used herein, is the number of gate inputs driven by a particular gate output. For example, the fanout of the driver of node 234 is two.

Referring again to FIG. 1, route evaluator 120 is an application program that analyzes actual as well as ideal signal node route timing information received from design file 110, determines which if any nodes are candidates for re-routing, and provides a prioritized set 130 of re-routable nodes. The nodes contained in prioritized set 130 can then be re-routed using router 140 based upon their assigned priority.

Router 140 is an application program known as an auto-router that receives placement and interconnection information from design file 110, receives a set of nodes to be routed, and then synthesizes the routes for each node. This synthesis takes place symbolically, each signal route conductor for each node comprised of one or more metal segments using one or more metal layers, and with different layers of metal interconnected by an electrical contact known as a "via." The completed route information is provided to design file 110. Router 140 may also receive a set of nodes to be re-routed from prioritized set 130. The operation of router 140 can be better understood with reference to FIG. 3.

Figure 3:
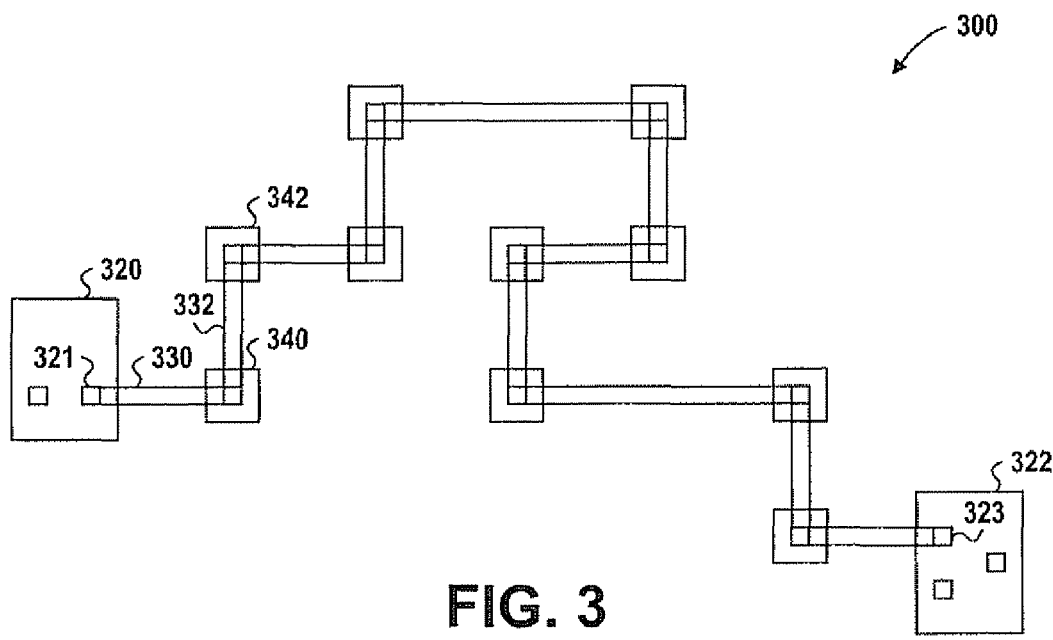
FIG. 3 illustrates a representative layout routing view of a portion of a device design represented by the design file of FIG. 1 in accordance with at least one embodiment of the present disclosure.

FIG. 3 illustrates in topological form a route 300 of a node, such as node 232 at FIG. 2, synthesized by router 140 at FIG. 1. Route 300 is a symbolic representation contained in design file 110 of actual metal conductors that ultimately are rendered on the manufactured electronic device. A symbol 320 represents the physical footprint of inverter 220 at FIG. 2. A symbol 322 represents the physical footprint of NAND gate 222 at FIG. 2. Polygons 330 and 332 represent two of the metal segments comprising node 232. Symbol 320 includes a terminal 321 representing the output connection of inverter 220. Symbol 322 includes a terminal 323 representing the first input terminal of NAND gate 222. Vias such as vias 340 and 342 are utilized to provide electrical conduction between the metallization represented by two polygons when the polygons represent different layers of metal. For example, polygon 330 can represent metal layer two (metal2) and makes contact with terminal 321 that is also implemented using metal2. Polygon 332 can represent metal3, and via 340 provides electrical conduction between the metal2 represented by polygon 330 and metal3 represented by polygon 332. Additional polygons and vias complete the route of node 232 between symbol 320 and symbol 322.

Route 300 is an exemplary route that can be synthesized by router 140. Router 140 can be tasked with routing any number of nodes between any number of device components. Obstructions including device components and unrelated route polygons place constraints on router 140, potentially resulting in long routes exhibiting correspondingly longer signal propagation delays that can lower the operating frequency while raising the total power dissipated of the device.

One or more previously completed routes can be removed and router 140 can subsequently be instructed to make another attempt at completing the route, perhaps realizing a better result. Identifying which routes are particularly poorly routed and thus constitute re-routable nodes can be difficult. The method disclosed herein can enable a designer to identify re-routable nodes and to prioritize the re-routable nodes. This allows the designer to focus attention on nodes more critical to the ultimate performance of the device.

In order to identify the re-routable nodes, route evaluator 120 first identifies nodes that are sub-optimal based on the signal propagation delay of the existing route of the node relative to the signal propagation delay of an ideal route of the node. This is accomplished through the use of ideal router 150 and delay simulator 160, both illustrated at FIG. 1.

Referring again to FIG. 1, ideal router 150 is an application program that receives placement and interconnection information from design file 110 in addition to a set of nodes to be routed, and synthesizes ideal signal route conductors representing optimal routes generated without regard to other node routes, congestion, or obstructions. The completed ideal route information is provided to design file 110. The operation of ideal router 150 can be better understood with reference to FIG. 4.

Figure 4:
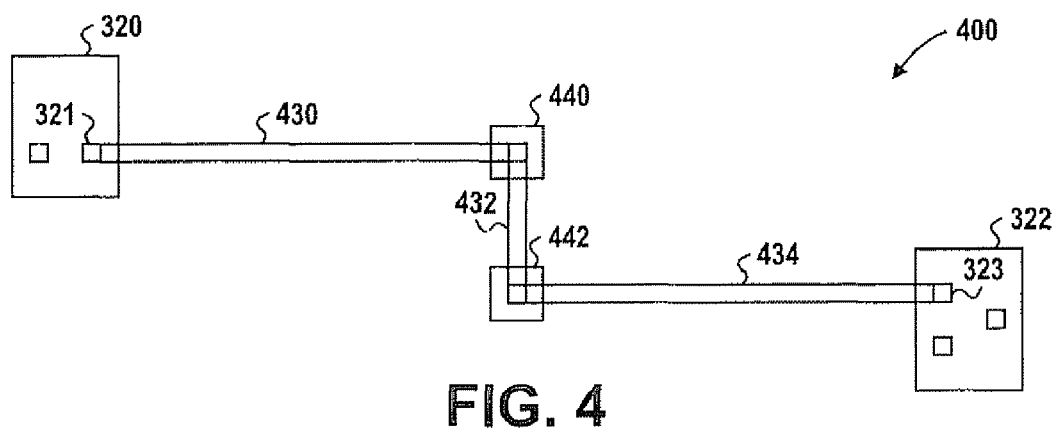
FIG. 4 illustrates an ideal layout routing view of a portion of a device design represented by the design file of FIG. 1 in accordance with at least one embodiment of the present disclosure.

FIG. 4 illustrates in topological form an ideal route 400 of node 232, which has been synthesized by ideal router 150. Ideal router 150 is effectively identical to router 140 but does not take any other routes and blockages into consideration when synthesizing a route. The route algorithm utilized by ideal router 150 is thus capable of synthesizing a substantially optimal result. Similar to route 300, route 400 interconnects terminal 321 of symbol 320 with terminal 323 of symbol 322. Route 400 includes metal segments represented by polygons 430, 432, and 434. A via 440 provides electrical conduction between the metal represented by polygon 430 and the metal represented by polygon 432. Similarly, a via 442 connects polygon 432 to polygon 434.

Delay simulator 160 is an application program that calculates the signal propagation delay of a circuit node or of a complete circuit path, the resulting delay information provided to design file 110. The operation of delay simulator 160 can be better understood with reference to FIG. 5.

Figure 5:
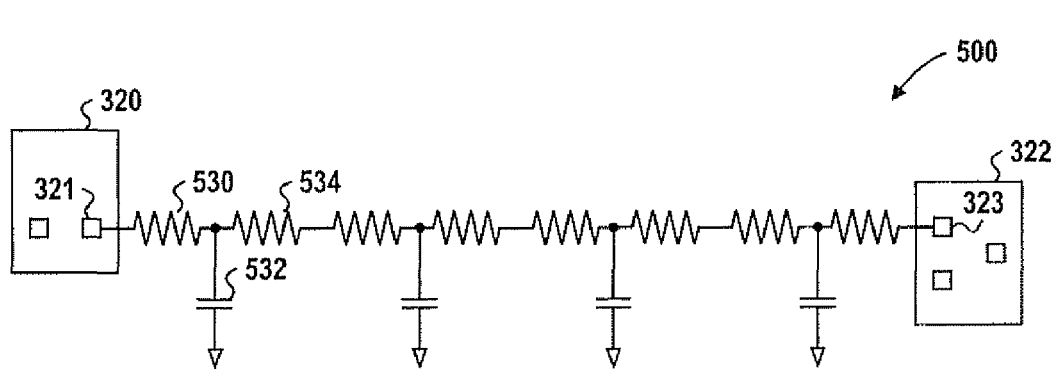
FIG. 5 illustrates a schematic view depicting delay calculation of a portion of a device design represented by the design file of FIG. 1.

FIG. 5 illustrates in schematic diagram form a circuit simulation view 500 that can represent route 300 or route 400. The polygons and vias of FIG. 3 and FIG. 4 are replaced with resistors (530, 534) and capacitors (532) by a process usually referred to as "parasitic extraction", again interconnecting terminal 321 of symbol 320 with terminal 323 of symbol 322. Once the routed node is rendered as resistors and capacitors, circuit analysis tools such as SPICE or any one of many timing simulators can be utilized to determine the signal propagation delay of a routed node.

Delay simulator 160 can be used to calculate the signal propagation delay of the existing route 300 as well as that of ideal route 400. Route evaluator 120 can then calculate a ratio of the simulated signal propagation delay of the existing route 300 versus the simulated signal propagation delay of ideal route 400. Similarly, the absolute difference between the simulated signal propagation delay of the existing route 300 and route evaluator 120 can also calculate the simulated signal propagation delay of ideal route 400. If the delay ratio or the absolute delay difference between these two routes exceeds a specified threshold, than the node can be determined to be a re-routable node. If the ratio or difference does not exceed a specified threshold, than the node can be determined to not be a re-routable node.

Simply re-routing all of the re-routable nodes in an ad-hoc manner typically will not achieve a substantial improvement in route quality. Final overall route quality is improved if the re-routable nodes are first prioritized by route evaluator 120 based upon the simulated signal propagation delay of the path encompassing the node. The signal propagation delay of a path, measured from a beginning latch, through a specific re-routable node, to an ending latch, can be calculated using delay simulator 160. For each re-routable node, delay simulator 160 calculates the signal propagation delay of the encompassing path. If multiple paths encompass the re-routable node, the signal propagation delay of each path is considered, and the greater of the signal propagation delays is used to determine the priority of the re-routable node. Route evaluator 120 can assign a priority to each re-routable node based upon the signal propagation delay of the encompassing path. Route evaluator 120 can then provide a prioritized set of re-routable nodes by assigning a higher priority to the re-routable nodes with a greater corresponding path signal propagation delay. Re-routable nodes with the highest priority can be re-routed first, using router 140.

As previously described, the maximum operating frequency of the electronic device is limited by the path with the longest signal propagation delay between the beginning and ending latches comprising the path. The design specification sets forth the intended operating frequency of the device and the reciprocal of this frequency is a corresponding maximum signal propagation delay. If the total signal propagation delay of a path, as determined by delay simulator 160, exceeds this maximum signal propagation delay, then the path will fail to meet the design specification. Such a path is said to have "negative slack". Conversely, if the total propagation delay of a path is less than this maximum propagation delay, then the path will satisfy the design specification. Such a path is said to have "positive slack." Using router 140 to re-route re-routable nodes encompassed by a path with negative slack can reduce the total signal propagation delay of the path and bring the path into compliance with the specification. Re-routing re-routable nodes encompassed by a path with positive slack is also worthwhile, as doing so will lower the capacitance of the node thereby decreasing the overall power dissipated by the device. Prioritized set 130 can therefore includes re-routable nodes, and those nodes can be re-routed, without regard to whether the simulated signal propagation delay of the path encompassing the re-routable node satisfies a timing specification of the electronic device design.

Some auto-routers will accept user-provided guidance and specific requirements regarding the metal layers that can be used during the re-routing of a re-routable node. Such metal layer stipulations can be determined by the distance the node route must traverse, the fanout of the node, the logical function supported by the node, and other criteria.

The results of other types of analysis also can be used to further refine the priority associated with a re-routable node. Modern design methodologies typically utilize a variety of other circuit analysis programs. Signal integrity analyzer 170 includes programs that can characterize a node with regard to any number of signal integrity metrics. Such analysis can include determining the voltage drop, the current density, signal noise (received or generated), local heating, or the signal transition time associated with the re-routable node. The circuit design must not only achieve the timing goals specified for the device, but must also adhere to specified limits associated with each of these signal integrity design checks. Each of these signal integrity parameters can be affected by the specific way a node is routed, and a node that is failing one of these checks can be brought into compliance by re-routing.

Referring again to FIG. 1, signal integrity analyzer 170 includes programs that can characterize a signal node with regard to any number of signal integrity metrics including voltage drop, current density, signal noise due to coupling, local heating, or signal transition time. This analysis is often included in a suite of "design quality checks" that identify if any node in the design fails to satisfy design specification or guidelines set forth for the particular device. The priority assigned to each re-routable node can be further refined based on the results of this analysis.

GUI 180 is an application program that can display information contained in design file 110 on a graphics display device. GUI 180 receives information from design file 110 and prioritized set 130, and can provide a means for the circuit designer to visually scrutinize and evaluate any attribute of the device design, particularly the re-routable nodes provided by prioritized set 130. Graphical display of design information can help the circuit designer understand the current state of specific design attributes, allowing the circuit designer to better orchestrate the ongoing design process and provide additional guidance to the CAD application programs. For example, GUI 180 can be used to display a symbolic representation of the polygons comprising the current route of a node, and perhaps overlay an image of the ideal route of the node. Route context such as device components and route blockage information also can be displayed. Routes enumerated in prioritized set 130 can be displayed. The signal propagation delay of a node or of the encompassing path can be displayed. Areas in the design exhibiting route congestion can be viewed. Different colors can be utilized to provide a visual indication of node priority or congestion.

Figure 6:
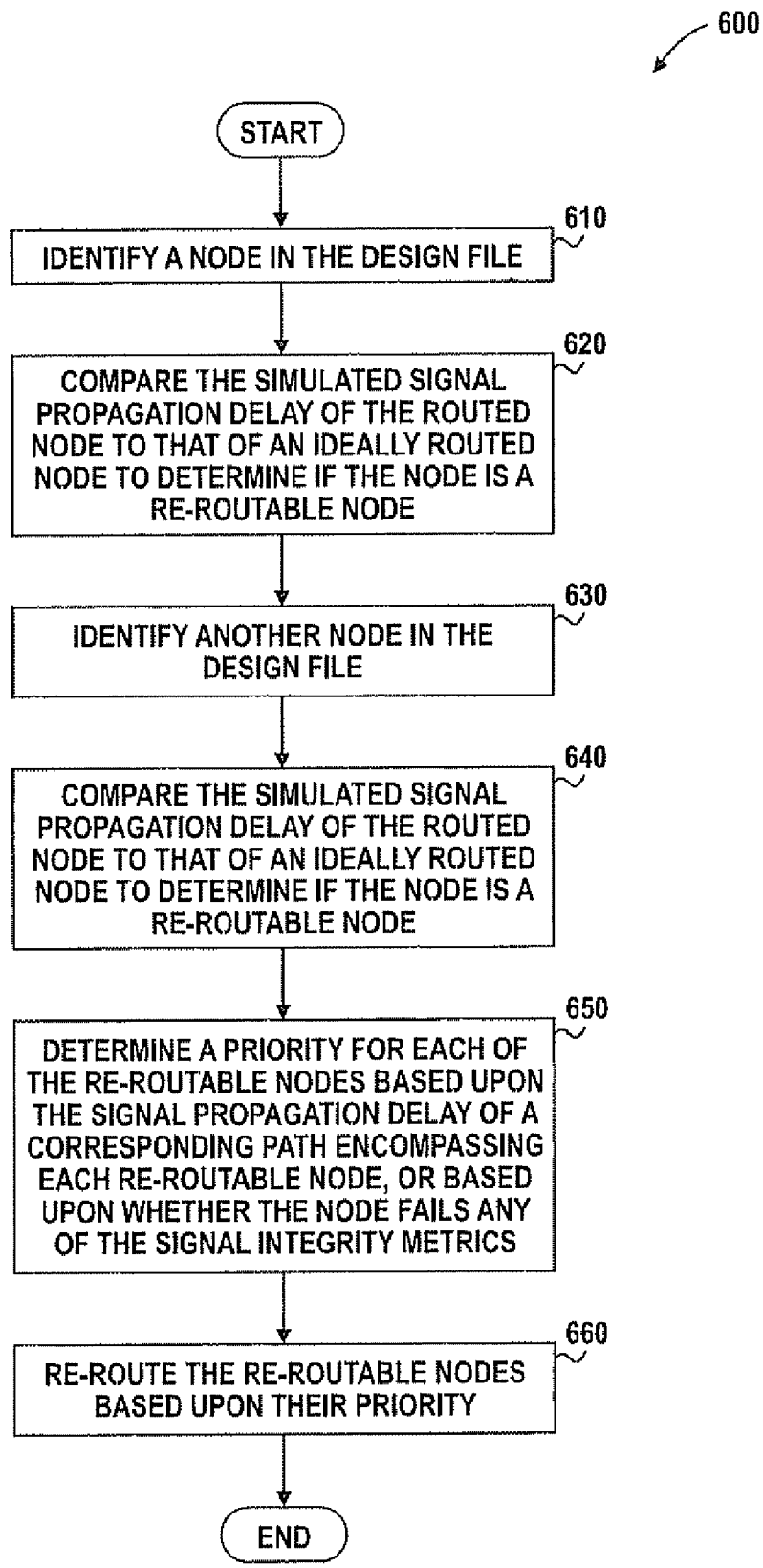
FIG. 6 is a flow diagram illustrating a method in accordance with at least one embodiment of the present disclosure.

FIG. 6 is a flow diagram illustrating method 600 in accordance with at least one embodiment of the present disclosure. Flow 600 starts at block 610 wherein a node in the design file is identified. The flow proceeds to block 620 wherein the simulated signal propagation time delay of the routed node is compared to that of an ideally routed node to determine if the node is a re-routable node. The flow proceeds to a block 630 wherein another node in the design file is identified. The flow proceeds to a block 640 wherein the simulated signal propagation time delay of the routed node is compared to that of an ideally routed node to determine if the node is a re-routable node. The flow proceeds to a block 650 wherein a priority for each of the re-routable nodes is determined based upon the signal propagation delay of a corresponding path encompassing each re-routable node, or based upon whether the node fails any of the signal integrity metrics. The flow proceeds to block 660 wherein the re-routable nodes are re-routed based upon their priority.

It should be appreciated that the specific methods described herein typically will be executed at a data processor device such as a computer. Such methods may be implemented in hardware, software, or combination thereof. For example, a specific method may be performed using software, which can include firmware, executed on one or more processing modules.

Figure 7:
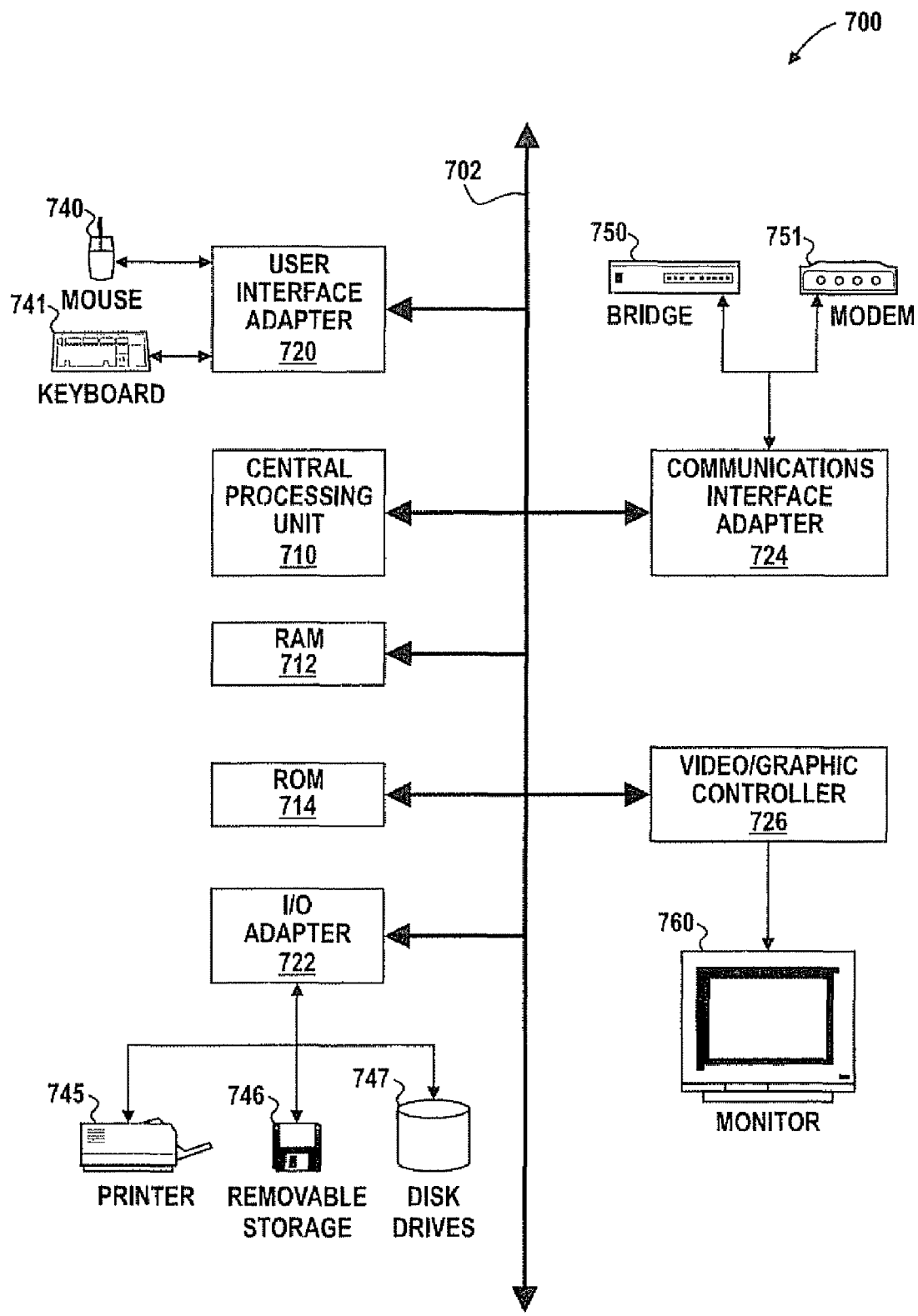
FIG. 7 is a block diagram of a particular embodiment of a data processor device in accordance with at least one embodiment of the present disclosure.

FIG. 7 illustrates, in block diagram form, a processing device in the form of a computer system 700. The computer system 700 is illustrated to include devices connected to each other and including a central processing unit 710, which may be a conventional proprietary data processor, memory including random access memory 712, read only memory 714, and input output adapter 722, a user interface adapter 720, a communications interface adapter 724, and a multimedia controller 726.

The input output (I/O) adapter 726 is further connected to, and controls, disk drives 747, printer 745, removable storage devices 746, as well as other standard and proprietary I/O devices.

The user interface adapter 720 can be considered to be a specialized I/O adapter. The adapter 720 is illustrated to be connected to a mouse 740, and a keyboard 741. In addition, the user interface adapter 720 may be connected to other devices capable of providing various types of user control, such as touch screen devices.

The communications interface adapter 724 is connected to a bridge 750 such as is associated with a local or a wide area network, and a modem 751. By connecting the system bus 702 to various communication devices, external access to information can be obtained.

The multimedia controller 726 will generally include a video graphics controller capable of displaying images upon the monitor 760, as well as providing audio to external components (not illustrated).

Generally, the system 700 will be capable of implementing the system and methods described herein. For example, the design file to be analyzed by the method described herein can be stored at disk drive 747 and accessed by the CPU 710 in response to an instruction.

Note that not all of the activities described above in the general description or the examples are required, that a portion of a specific activity may not be required, and that one or more further activities may be performed in addition to those described. Still further, the order in which activities are listed are not necessarily the order in which they are performed. After reading this specification, skilled artisans will be capable of determining what activities can be used for their specific needs or desires.

The complexity of modern device designs, combined with aggressive development schedules, requires that efforts to improve quality, such as improving signal routes, be focused so as to render the highest return for invested time and resources. Methods disclosed herein for identifying and determining a priority of re-routable nodes can help a circuit designer complete such tasks in an efficiency and productive manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A computer implemented method comprising:
    identifying a plurality of nodes in a design file, wherein the design file represents an electronic device design, where each of the plurality of nodes represents a conductor between device components of the electronic device design, the plurality of nodes including a first node;
    determining if the first node is a first re-routable node based upon a comparison of a simulated signal propagation delay of an existing route of the first node to a simulated signal propagation delay of a defined route of the first node;
    in response to determining that the first node is a first re-routable node, determining a priority of the first re-routable node with respect to a second re-routable node based upon a simulated signal propagation delay of a first path encompassing the first re-routable node and a simulated signal propagation delay of a second path encompassing the second re-routable node to provide a prioritized set of re-routable nodes; and
    storing the prioritized set of re-routable nodes.

2. The method of claim 1 wherein:
    determining if the first node is a first re-routable node comprises calculating a ratio of the simulated signal propagation delay of the existing route of the first node to the simulated signal propagation delay of the defined route of the first node; and
    determining that the first node is not a re-routable node in response to determining that the ratio does not exceed a specified threshold.

3. The method of claim 1 wherein:
    determining if the first node is a first re-routable node comprises calculating a ratio of the simulated signal propagation delay of the existing route of the first node to the simulated signal propagation delay of the defined route of the first node; and determining that the first node is a re-routable node in response to determining that the ratio exceeds a specified threshold.

4. The method of claim 1 further comprising:
evaluating regions of the electronic device design exhibiting route congestion based on the prioritized set of re-routable nodes.

5. The method of claim 1 further comprising:
receiving signal integrity information for the first node of the prioritized set wherein the signal integrity information is a voltage drop, a current density, signal noise, local heating, or a signal transition time; and
updating the priority of the first re-routable node based upon the signal integrity information.

6. The method of claim 1 further comprising:
re-routing a first re-routable node of the prioritized set; and
updating the design file based upon the re-routing.

7. The method of claim 6 further comprising:
re-routing a second re-routable node of the prioritized set after re-routing the first re-routable node of the prioritized set in response to determining that the priority of the second re-routable node is less than the priority of the first re-routable node.

8. The method of claim 6 further comprising:
determining a routing metal layer based upon a routing distance of the first node of the prioritized set; and
wherein re-routing the first re-routable node comprises re-routing the first re-routable node based on the routing metal layer.

9. The method of claim 8, wherein:
determining a routing metal layer comprises determining a routing metal layer based on a fanout of a driver of the first node of the prioritized set.

10. The method of claim 1 further wherein:
the first path encompassing the first re-routable node satisfies a timing specification of the electronic device design.

11. The method of claim 1 further comprising:
displaying a symbolic representation of the first node of the prioritized set in a graphical user interface.

12. The method of claim 11 further comprising:
displaying a symbolic representation of the defined route of the first node of the prioritized set in the graphical user interface.

13. The method of claim 11 further comprising:
displaying a symbolic representation of route blockage information in the graphical user interface.

14. The method of claim 1 wherein:
the design file includes a representation of: connectivity of a plurality of device components; the plurality of nodes; the simulated signal propagation delay of the existing route of the first node; the simulated signal propagation delay of the defined route of the first node; and the simulated signal propagation delay of the first path encompassing the first node.

15. A computer implemented method comprising:
identifying a plurality of nodes in a design file, wherein the design file represents an electronic device, where each node of the design file represents a conductor between device components;
receiving a first time delay representing a simulated signal propagation delay of a first of the nodes;
receiving a second time delay representing a simulated ideal signal propagation delay of the first of the nodes;
comparing the first time delay to the second time delay;
determining if the first node is a first re-routable node based on the comparing;
in response to determining that the first node is a first re-routable node, receiving a simulated signal propagation delay for a first path encompassing the first re-routable node;
in response to receiving the simulated signal propagation delay of the first path, determining a priority of the first re-routable node with respect to a second re-routable node based upon the simulated signal propagation delay of the first path encompassing the first re-routable node and a simulated signal propagation delay of a second path encompassing the second re-routable node to provide a prioritized set of re-routable nodes; and
storing the prioritized set of re-routable nodes.

16. The method of claim 15 further comprising:
re-routing a first re-routable node of the prioritized set; and
updating the design file following the re-routing.

17. A non-transitory computer readable medium storing instructions operable to control operation of a data processor to:
identify a plurality of nodes in a design file, wherein the design file represents an electronic device design, where each of the plurality of nodes represents a signal routing conductor between device components of the electrical device design, the plurality of nodes including a first node;
determine if the first node is a first re-routable node based upon a comparison of a simulated signal propagation delay of an existing route of the first node to a simulated signal propagation delay of an ideal route of the first node;
determine a priority of the first re-routable node with respect to a second re-routable node based upon a simulated signal propagation delay of a first path encompassing the first re-routable node and a simulated signal propagation delay of a second path encompassing the second re-routable node to provide a prioritized set of re-routable nodes; and
store the prioritized set of re-routable nodes.

18. The computer readable medium of claim 17 further comprising:
instructions operable to select a first node of the prioritized set; and
instructions operable to re-route the first node in response to selection of the first node.

19. A computer readable medium of claim 18 wherein the instructions operable to select the first node comprise:
instruction operable to re-route a second re-routable node of the prioritized set after re-routing the first re-routable node of the prioritized set in response to determining that the priority of the second re-routable node is less than the priority of the first re-routable node.

20. A computer readable medium of claim 17 wherein the instructions to determine if the first node is a re-routable node comprise:
instructions operable to calculate a ratio of the simulated signal propagation delay of the existing route of the first node to the simulated signal propagation delay of the ideal route of the first node; and
instructions operable to determine that the first node is a re-routable node in response to determining the ratio exceeds a specified threshold.

* * * * *